July 23, 1968 G. KLEE 3,393,565
PRESSURE TRANSDUCER
Filed April 5, 1965 7 Sheets-Sheet 1

Inventor:
Gerhard Klee
By
Watson, Cole, Grindle & Watson
Atty.s.

(b-b)

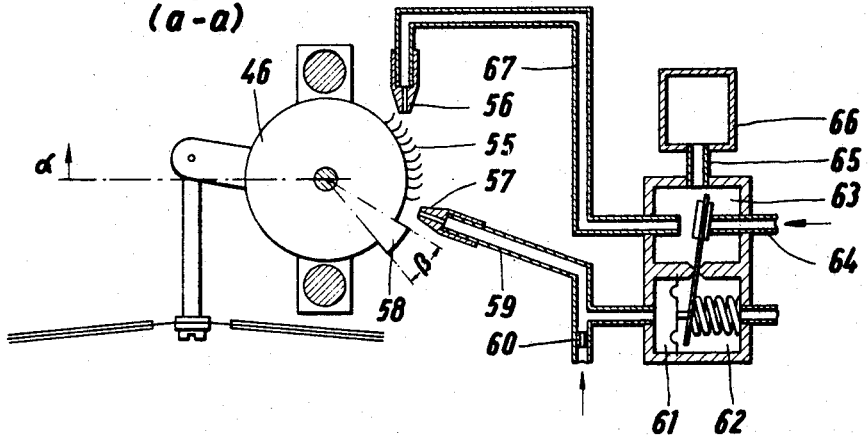
Fig. 4 (a-a)
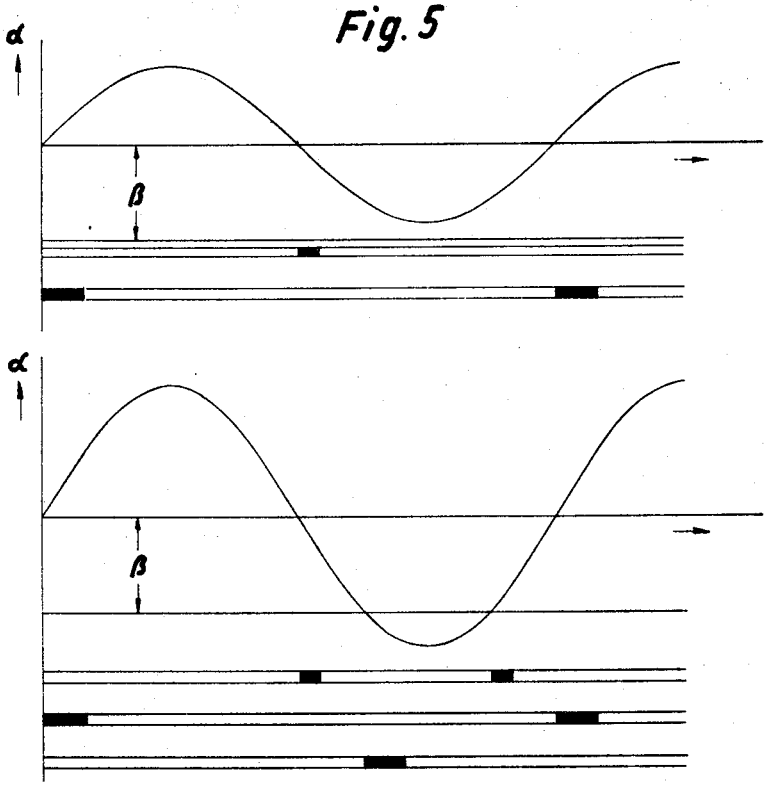
Fig. 5

(a - a)

July 23, 1968    G. KLEE    3,393,565
PRESSURE TRANSDUCER

Filed April 5, 1965    7 Sheets-Sheet 5

(a-a)

(a-a)

Inventor:
Gerhard Klee
By
Watson, Cole, Grindle & Watson
Attys.

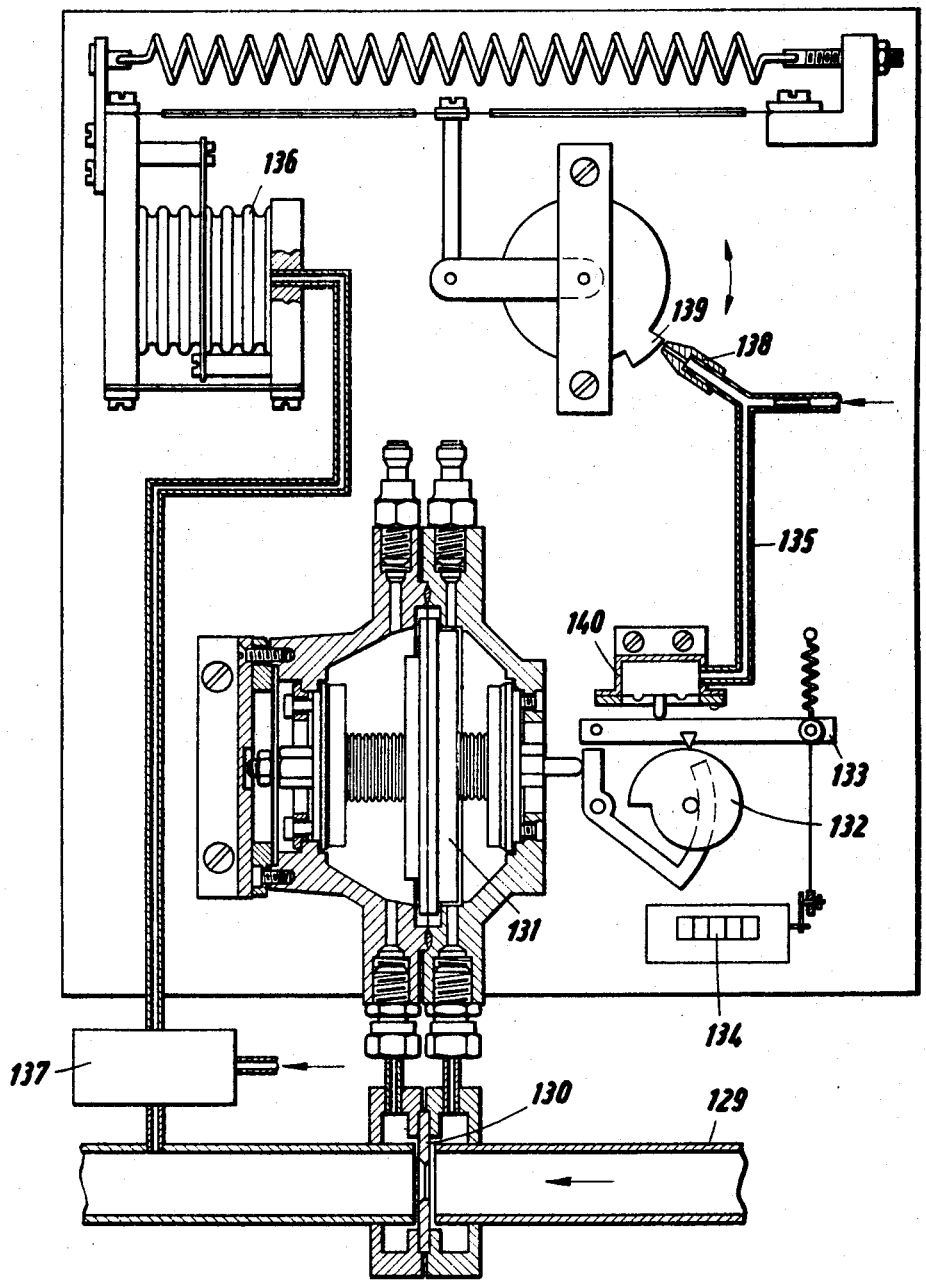

United States Patent Office 3,393,565
Patented July 23, 1968

3,393,565
PRESSURE TRANSDUCER
Gerhard Klee, 104 am Fuchshohl, Frankfurt am
Main-Ginnheim, Germany
Filed Apr. 5, 1965, Ser. No. 445,474
3 Claims. (Cl. 73—398)

ABSTRACT OF THE DISCLOSURE

A measuring transducer for measuring devices, particularly for flow meters and having tensile means adapted to vibrate at a frequency which is controlled by the tension of the tensile means and having also at least one measuring signal generator which is responsive to a variable and is arranged to control the frequency of the tensile means in response to this variable. The transducer also includes means for sensing the frequency of the vibrating tensile means, together with means connected thereto, to modify the frequency and to increase the stability of the vibration of the tensile means.

---

This invention relates to a measuring transducer, which is adapted to transform a force generated in a measuring instrument by any desired physical input parameter into a periodic phenomenon, and which comprises means for measuring, indicating, or recording the frequency of this periodic phenomenon, or integrating this frequency as a function of time or transforming said frequency into any desired signals or pulses.

The measuring transducers previously used in the process industries convert physical parameters either into an air pressure or into a pulse-modulated direct current.

In the method according to the invention, the force derived from the input parameter is applied to tension one or more strings or bands, which are capable of vibration. The natural frequency of the string depends on the tension of the string and is a measure of the physical parameter applied to the string. The relation between the tension K and the frequency $f$ is a square function, which may be expressed as follows:

$$f = c \times \sqrt{K}$$

wherein $c$ is a proportionality constant. In view of this physical relation, the transducer is particularly suitable for flow rate measurements. In this case the frequency varies with the root of the pressure differential measured at a measuring orifice or a measuring nozzle. Hence, the flow rate is proportional to the frequency.

Just as for measuring a pressure differential, the measuring transducer may be used for measuring any other physical parameter, such as static pressure, liquid level of a container, temperature etc.

The force-frequency transducer which will be described hereinafter enables also a variation of the frequency by more than one controlling parameter in a simple manner. This enables, e.g., so-called corrected flow rate measurements, i.e., measurements which are corrected for variables of state, such as pressure, temperature, specific gravity etc.

The invention includes further some non-contacting drive means for exciting strings, bands and pendulums.

The invention will be explained with reference to illustrative embodiments, which are shown in the drawing.

FIG. 4 is a sectional view of a further modified embodiment.

FIG. 5 is a graph illustrating the control function.

FIG. 10 illustrates another arrangement for a flow rate measurement which is corrected for pressure.

Figure 1:
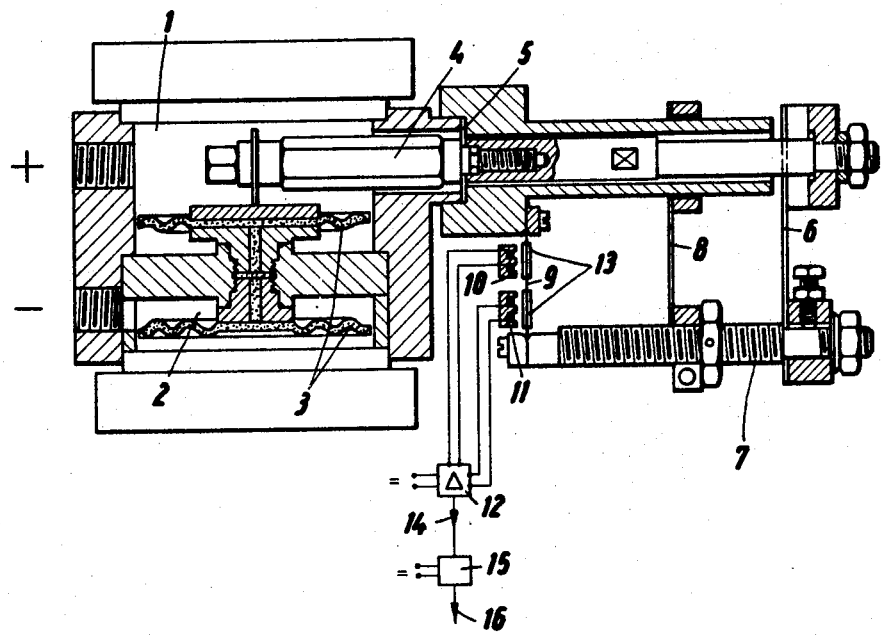
FIG. 1 is a part sectional and side view showing a measuring transducer according to the invention in combination with a pressure differential detector.

With reference to FIG. 1, a higher pressure is applied to the chamber 1 of the pressure differential pick-up and a lower pressure is applied to the chamber 2. By a diaphragm 3, which is responsive to the pressure differential in known manner, the pressure differential is converted into a force acting on the lever 4. This lever is pivoted in a pressure-tight lead-out 5, which is also known per se. The string 9 is tensioned by means of the connector 6 and the lever 7. The tension of the string 9 is thus proportional to the pressure differential between the chambers 1 and 2. The relation between the force generated by the pick-up and the tension of the string 9 may be varied by a displacement of the movable band 8. This displacement results in a variation of the range of the instrument.

Vibration is imparted to the string 9 by means of a displacement pick-up 10, an amplifier 12 and an exciter 11. The pick-up 10 may be, e.g., a capacitive or inductive pick-up. The drive means (exciter) 11 may be, e.g., an electromagnet. The amplifier 12 amplifies the input signal and produces a corresponding phase angle between the displacement pick-up 10 and the exciter 11. Additional circuitry, known per se, is provided to ensure that the output of the amplifier 12 delivers short-time pulses, such as square pulses, which act on the vibrating string 9 approximately when it passes through zero. Alternatively, the amplifier may produce, e.g., a sinusoidal alternating field, which acts continuously on the vibrating string. For increased stability and in order to reduce the frequency, the string 9 is provided with stiffeners 13. Alternatively, the string 9 may be excited by other means, such as pneumatic, mechanical or hydraulic means.

The output 14 of the amplifier 12 delivers a signal at a frequency which is proportional to the square root of the differential pressure. The signal takes the form of any desired pulses and may be integrated directly or by means of a frequency divider in a counter. If an electric output signal in the form of a pulse-modulated direct current is desired, the frequency may be converted by the measuring signal converter 15 into a pulse-modulated direct current appearing at the output 16.

Figure 3A:
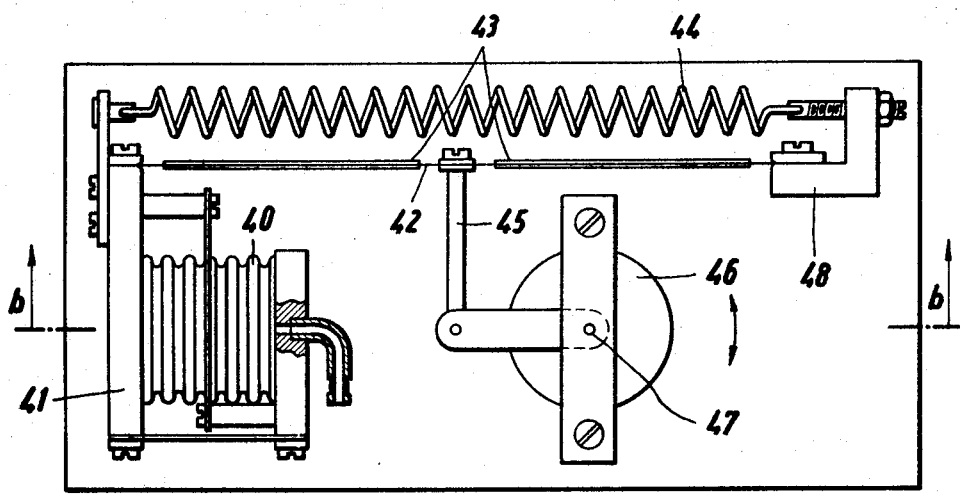
FIG. 3a is a plan view of a modified transducer.
Figure 3B:
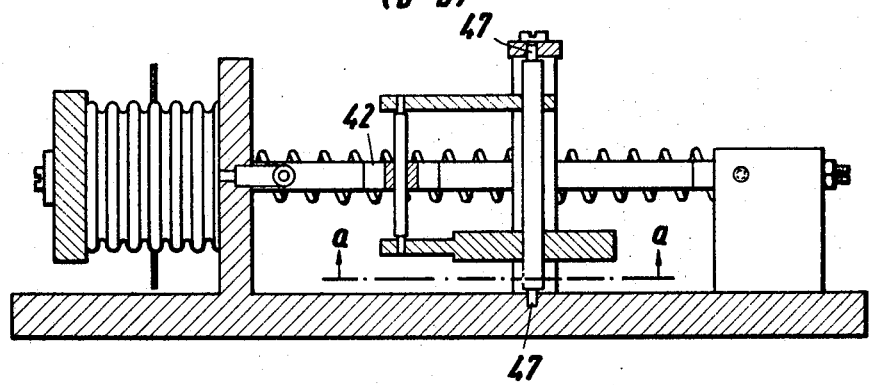
FIG. 3b is a sectional view taken on line b—b of FIG. 3a in the direction of the arrows.
Figure 6:
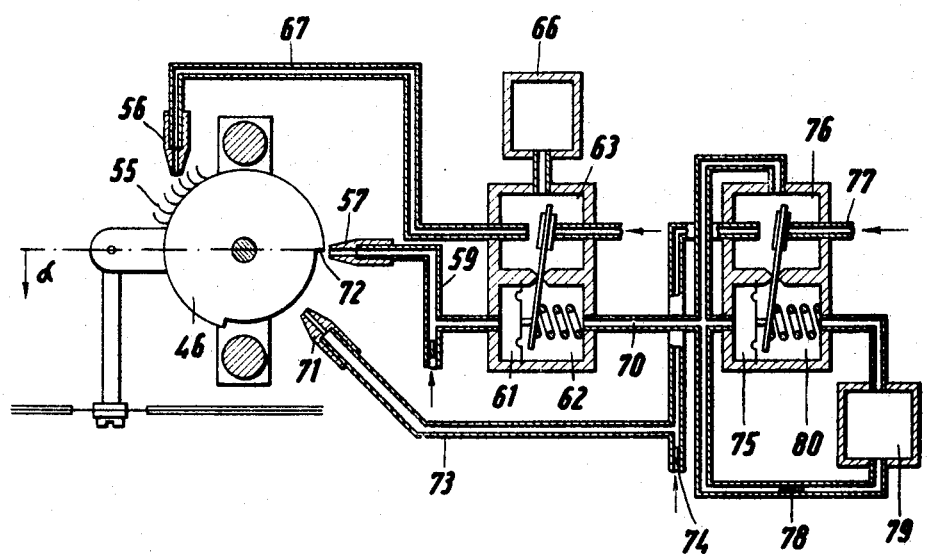
FIG. 6 is a sectional view showing a means for limiting the amplitude of a pendulum which is operated by a non-contacting, pneumatic drive means.
Figure 7:
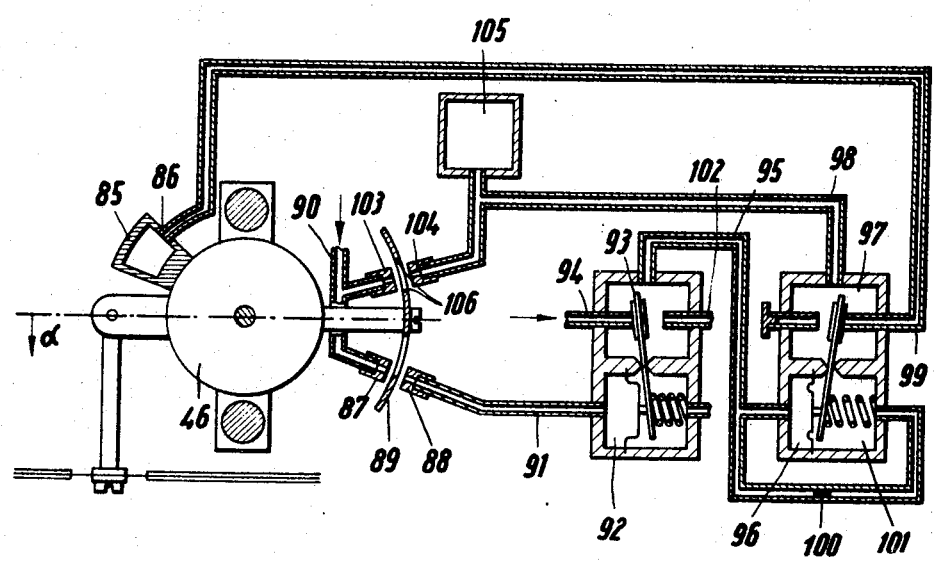
FIG. 7 is a sectional view showing another non-contacting pneumatic drive means.

The frequency of the vibrating string 9 is relatively high. Low frequencies can be obtained by an increase of the mass of the vibrating system, e.g., by coupling a rotatable mass, such as is shown in FIG. 3, to the string. The system may be maintained in a state of vibration, e.g., by a non-contacting, pneumatic drive means, such as is shown in FIGS. 4, 6 and 7.

Figure 2:
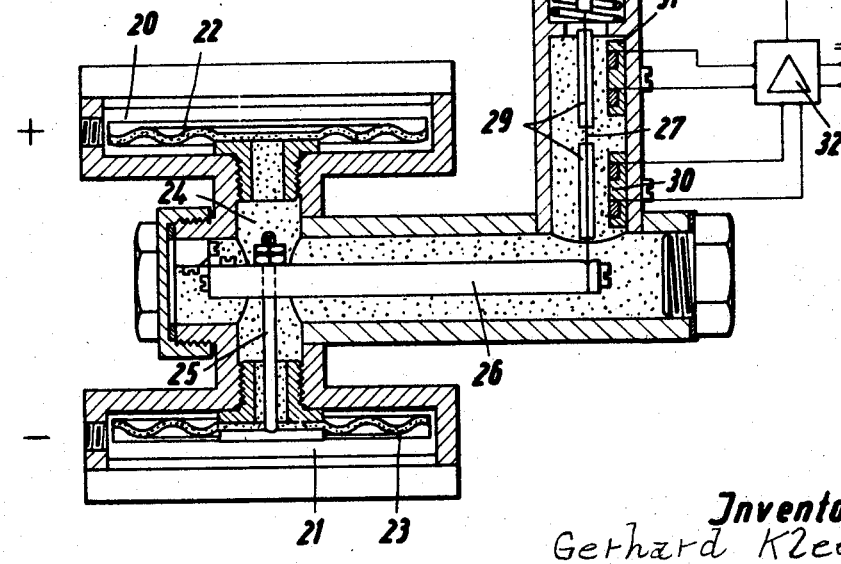
FIG. 2 is a sectional view showing another embodiment of a measuring transducer according to the invention as applied to the measurement of pressure differentials.

Another embodiment of a pressure differential measuring transducer according to the invention is shown in FIG. 2. It differs from the embodiment according to FIG. 1 in that the tensioned string vibrates in the transmission liquid so that the lead-out 5 is not required. The chamber 20 is subjected to a higher pressure than the chamber 21. The rigidity of the diaphragm 22 should be as low as possible so that the pressure of the transmission liquid in the chamber 24 is virtually equal to the pressure in the chamber 20. The transmission liquid in the chamber 24 between the diaphragms should have a low viscosity and a coefficient of thermal expansion which is as low as possible. A low coefficient of thermal expansion is required in order to minimize the temperature error which is due to the fact that the measuring diaphragm 22 has a finite stiffness. The force which results from the pressure differential acting on the diaphragm 23 tensions by means of a connector 25 and a lever 26 the string 27. Hence, the frequency of the string 27 is again a measure of the applied pressure differential. The prestressed spring 28 prevents an overloading of the string 27. A modification of the arrangement shown in FIG. 2 will be obtained if the lever transmission shown in FIG. 2 is reduced to zero. In this case one end of the spring 27 is secured to the measuring diaphragm 23 whereas the other end is secured to the housing in the chamber 24. This arrangement is much simpler in structure than the arrangements shown in FIGS. 1 and 2. Just as in the embodiment shown in FIG. 1, the string 27 shown in FIG. 2 is provided with stabilizers 29 and is maintained in a state of vibration by a displacement pick-up 30, exciter 31 and amplifier 32. The displacement pick-up 30 and exciter 31 are arranged in the chamber 24 filled with the transmission liquid so that the only elements which must be led out are connecting wires. It is also possible, of course, to arrange the displacement pick-up 30 and the exciter 31 on the outside closely beside the tube 33 which surrounds the vibrating string. The converter 34 for producing a modulated direct current at the output may also be connected to the output of the amplifier 32 if, e.g., a pulse-modulated direct current is desired.

In the arrangements shown in FIGS. 1 and 2, the string will vibrate at relatively high frequencies. Lower frequencies will be desired in certain cases. A reduction of the frequency can be effected, e.g., by the connection of additional masses to the string itself. In this case the excitation of the string may be effected by means similar to those shown in FIGS. 1 and 2. FIG. 3 shows another means for reducing the frequency of the string. In FIG. 3, a band of spring steel is used instead of a string. Another suitable element could also be employed, such as a string or a toggle. In this case, the mass is not directly mounted on the band or string but a mass 46 is rotatably mounted in a bearing 47 and is connected by a connector 45 to the band 42. Very low frequencies can be obtained with this arrangement; at the same time, the device is highly independent of its orientation. The arrangement shown in FIG. 3 may be described as a mechanical pendulum, which is restored by the spring steel band 42.

Whereas a pressure differential is converted into a periodic phenomenon in the system of FIGS. 1 and 2, FIG. 3 shows a transducer for converting static pressure into frequency. The device is preferably designed for an input range of 3 to 15 pounds per square inch and for this reason fits into the pick-up system which is used in process control. For instance, if a pressure differential at a measuring orifice or nozzle is converted by a pick-up into a pressure of 3 to 15 pounds per square inch and the output of the pick-up is applied to the measuring transducer described in FIG. 3, the frequency of the measuring transformer will correspond to the flow rate. In this case, the output of the measuring transducer can be directly applied to a counter. The applied static pressure is converted by the bellows 40 into a force which tensions the band 42 by means of the lever 41. Hence, the frequency of the mechanical pendulum is proportional to the square root of the applied pressure. The spring 44 serves for a zero adjustment.

At low frequencies, particularly near zero frequency, the inherent stiffness of the band 42 becomes significant. This inherent stiffness is not infinitesimal. Errors occur and the band 42 may become distorted. These disadvantages will be eliminated if the band 42 in FIG. 3 is replaced by a toggle link because the pivots of a toggle link have no restoring force so that a satisfactory measurement can also be effected near zero frequency.

The pivots of toggles, however, have a slight friction, which may be disturbing. In the arrangement shown in FIG. 3 the disadvantages which have been mentioned are avoided in that the steel band 42 is reinforced by two bars 43 in the portions between the lever 41 and the connector 45 and between the tensioning bracket 48 and the connector 45. These bars extend close to the gripped portions of the band. Those portions of the band which are not reinforced act as a spring joint so that both the bearing friction of a toggle and a distortion of the steel band are precluded. This may be achieved with any desired spring leaves (single springs, cross-shaped spring).

The means for driving the mechanical pendulum are not shown in FIG. 3. Some possible drive means are shown in the subsequent figures in fragmentary sectional views taken on line a—a in FIG. 3. In all examples, the drive means are non-contacting. The pneumatic drive means enable a control of the amplitude. The drive means which are shown can not only be applied to the torsion pendulum shown in FIG. 3 but also to any other pendulums provided that their frequency is not too high.

In FIG. 4, small blades 55 are mounted on the rotating mass 46 and may be subjected to a blast from the blast nozzle 56. If the drive effected by blowing is in the proper phase, this arrangement will provide a non-contacting, pneumatic drive means. The control is effected by a non-contacting sensing in conjunction with a pneumatically controlled three-way valve. Sensing is effected by a variation of the cross-section of an outlet nozzle 57. The variation of the cross-section is effected by a suitable control land 58 of the rotatable mass 46. The conduit 59 is connected by a constriction element 60 to a compressed air system. If the outlet nozzle 57 is almost closed by the control land 58, the pressure in the conduit 59 and in the diaphragm chamber of the valve will be increased. The pressure in the chamber 61 switches the three-way valve 63. The non-contacting sensing may also be effected in this case by a blast nozzle and a receiving nozzle, as is shown in FIG. 7. The control land 58 intersects the jet. The three-way valve is connected as follows:

Conduit 64=air supply
Conduit 65=closed air chamber 66
Conduit 67=blowing nozzle 56

The function of the control means may be explained with reference to the graph shown in FIG. 5. It may be assumed that the pendulum is passing through zero (α=0) in the right-hand sense. Just before the zero position of the pendulum, the three-way valve 63 is in its left-hand position so that the air chamber 66 communicates with the air supply. Hence, the supply pressure is applied to the air chamber. When the mass passes in the right-hand sense through the α=0 position, the conduit 59 and with it the diaphragm drive is vented because the control land of the rotating mass opens the outlet nozzle 57. As a result, the three-way valve assumes the position shown in FIG. 4. In order to effect an exact change-over of the three-way valve when this is needed, the drive means may be provided with a snap device, such as a snap spring or magnet. The pressure in the volume 66 is emptied through the conduits 65 and 67 and the blast nozzle 56. Hence, there is an air flow for a limited time and this air flow applies to the rotating mass by means of the blades a right-hand torque for driving the mass.

The duration of this flow is indicated in the upper graph of FIG. 5 and depends on the dimensioning of the cross-sections and of the volume 66. The pendulum swings to its maximum right-hand position (α=maximum). When the pendulum returns through zero in the left-hand sense, the control land 58 closes the outlet nozzle 57 so that the three-way valve 63 assumes again its left-hand position. In this position the air chamber 66 communicates again with the air supply and is re-filled. The filling time is also indicated in the upper graph. The pendulum swings now to its extreme left-hand position. The drive means becomes again effective during the next passage of the pendulum through zero. The covering angle β of the control edge is also shown in the upper graph of FIG. 5. The present graph is applicable only when the covering angle β exceeds the maximum amplitude of the pendulum. This arrangement ensures that energy will always be supplied to the pendulum at the correct time so that the oscillation of the pendulum is maintained. In order to avoid undesirably large or small amplitudes in the case of a change of the frequency of the pendulum, means are provided for limiting the maximum amplitude of the oscillations.

If the covering angle β of the control land 58 is less than the maximum amplitude of the pendulum, the control land 58 will open the outlet nozzle 57 when this covering angle is exceeded by the pendulum. Whereas the resulting control function is the same as that described hereinbefore, the blast nozzle 56 blows at a time at which the pendulum is rotating in the left-hand sense. The drive means act in a right-hand sense so that the air pulse is in phase opposition to the pendulum and brakes the latter. The drive action consisting of the blowing during the right-hand rotation is performed as described hereinbefore. The chronological performance of an oscillation of the pendulum with braking is shown in the lower diagram of FIG. 5.

When the pendulum passes through zero in the right-hand sense, the drive pulse is applied. When the pendulum passes through zero in the left-hand sense, the filling operation begins. A braking pulse will be applied when the control land 58 opens the outlet nozzle 57 (α=β). When the pendulum is subsequently rotating in the right-hand sense, the control land closes the outlet nozzle and the air chamber is replenished again. When the pendulum passes through zero in the right-hand sense, a drive pulse is again released. This arrangement ensures that a predetermined amplitude cannot be exceeded regardless of the air pressure in the conduit 64 and of the frequency of the pendulum and of the losses of the pendulum.

The described amplitude limitation need not be effected by the outlet nozzle which controls the drive but two separate sensing systems may be used, one of which serves for driving and the other for braking.

Another means for limiting the amplitude of a pendulum operated by a non-contacting pneumatic drive means is shown in FIG. 6. In this arrangement, the drive pulse is shut off for a predetermined time when a pregiven amplitude is exceeded so that the amplitude is reduced by the pendulum losses. A shut-off for a predetermined time may be effected when a maximum amplitude is exceeded. Alternatively, the shut-off may be effected for a predetermined number of oscillations.

The structural arrangement is apparent from the figure which will now be described. FIG. 6 is again a fragmentary sectional view taken on line a—a of FIG. 3a showing a mechanical pendulum. The drive of the pendulum without braking is effected as has been described with reference to FIG. 4 provided that the conduit 70 is vented. When pressure is applied to the conduit 70, the three-way valve 63 will not move even if pressure is applied to the chamber 61 because the nozzle 57 is closed.

To initiate the braking operation, another nozzle 71 is arranged at a predetermined angle with respect to the nozzle 57. This angle should be as large as the intended maximum amplitude. When the permissible amplitude is exceeded, the land 72 will cover the nozzle 71 so that pressure is applied to the conduit 73, which is connected to the air supply through a constriction element 74. The pressure in the conduit 73 causes an increase of the pressure in the chamber 75 so that the three-way valve 76 is changed over to its other, left-hand position. When the three-way valve has been changed over, the conduit 77 connected to the air supply communicates directly with the chamber 75 so that the three-way valve 76 remains in this position even when the pressure in the conduit 73 decreases. In this right-hand position of the valve, the arrangement constitutes a storage device or self-holding relay. When pressure is applied to the chamber 75, pressure will also be applied to the chamber 62 through the conduit 70. Hence, the drive pulses in the chamber 61 will become ineffective and additional driving energy will not be supplied to the pendulum. The diaphragm chamber 80 is slowly filled with air through the constriction element 78 and the chamber 79. When the pressure in the chamber 80 has become sufficiently high, the three-way valve 76 returns to the position shown in the drawing and the conduit 70 can be vented. Then the drive means is again effective. If the constriction element 78 is adjustable, the shut-off time may be varied by a change of the free cross-section of the constriction element. The disclosed arrangement including the constriction element 78 and the volume 79 corresponds to a relay which is self-holding for a predetermined time. Alternatively, the drive pulses may be interrupted for a predetermined number of oscillations. In this case, the three-way valve 76 may be replaced by a cascaded counter arrangement, which counts the pressure pulses in the conduit 59 and causes a venting of the conduit 67 after the pregiven number of pulses. The operation of this cascaded counter arrangement is not initiated until the pregiven amplitude has been exceeded. Counting is initiated by a pressure surge in the conduit 73.

This aspect of the invention is not restricted to the embodiment described with reference to FIG. 6 but is generally applicable to all amplitude regulating means in which the amplitude is reduced by an interruption of the drive pulse. The interruption may be effected for a predetermined time or for a predetermined number of pulses.

FIG. 7 shows another non-contacting pneumatic drive means. Instead of blades, such as are shown in FIGS. 5 and 6, a small cylinder 85 is mounted on the rotating mass 46. A blast nozzle applies pressure surges in proper phase to this cylinder. The blast nozzle consists of a piston 86. The cylinder 85 and the piston 86 are so shaped that the clearance between the piston and cylinder walls is very small in the zero position of the pendulum shown on the drawing. Just as in the arrangements described hereinbefore, the drive pulse is applied approximately when the pendulum passes through zero. This ensures an optimum utilization of the pulse.

The piston 86 and the cylinder 85 are so designed that the clearance between the piston and cylinder walls is greatly increased when the piston 86 has entered the cylinder 85 so that an additional damping of the torsion pendulum is avoided.

The control is again effected by a non-contacting sensing in conjunction with two pneumatic three-way valves. In this case the sensing is effected by a blast nozzle 87 and a receiving nozzle 88 in a manner known per se. A control member 89 interrupts the air jet or enables it to flow. The control member 89 is firmly connected to the rotating mass 46. Air is supplied to the blast nozzle 87 by a conduit 90. If the control member 89 enables a flow of the air jet from the blowing nozzle 87 to the receiving nozzle 88, pressure will be applied to the conduit 91 and this pressure will be transmitted to the diaphragm chamber 92 of the three-way valve 93. The three-way valve 93 is in the position shown in the drawing. When the mass passes through the zero in the left-hand sense, the control member 89 interrupts the air jet so that the conduit 91 and the chamber 92 are discharged and the three-way valve 93 is shifted to its right-hand position. The air pressure applied to the conduit 94 is transmitted through the conduit 95 into the diaphragm chamber 96 of the three-way valve 97 so that the same is changed over to establish a communication between the conduits 98 and 99. Air is supplied to the conduit 98 by a second arrangement including a blast nozzle and a receiving nozzle. This air flows into the conduit 99 and through the blast piston 86 into the cylinder chamber 85. Through a constriction element 100, the compressed air in the conduit 95 fills the the second diaphragm chamber 101 of the three-way valve 97 so that the same falls back to the position shown in the drawing after a predetermined time. Hence, the communication between the conduits 98 and 99 exists only for a short time so that only one pressure impulse is applied to the driving cylinder 85 at the time when the pendulum passes through zero in the left-hand sense. Pressure is again applied to the diaphragm chamber 92 when the pendulum passes through zero in the right-hand sense. The compressed air in the conduit 95 escapes through the conduit 102. During this time, the three-way valve 97 remains in the position shown in the drawing. Hence, when the pendulum passes through zero in the left-hand sense, energy is supplied to the pendulum to maintain it in a state of oscillation. This arrangement comprises also means for limiting the amplitude. This is effected by a control of the air supply to the three-way valve 97.

The control blade 89 moves between the blast nozzle 103 and the receiving nozzle 104 as well as between the blast nozzle 87 and the receiving nozzle 88. In the present case, the control blade is designed in such a manner that a flow of the air jet from the blast nozzle to the receiving nozzle is enabled when the amplitude is below its permissible maximum. When this maximum is exceeded, the two limiting edge portions 106 of the control blade interrupt the air supply to the conduit 98 in the extreme positions of the pendulum so that the pressure in the conduit 98 and the storage chamber 105 connected to it is reduced. As a result, the drive pulses will be weaker and the amplitude will be reduced. A state of equilibrium will be assumed in which the maximum amplitude which is permissible and determined by the limiting edge portions 106 of the control blade 89 is just reached.

The non-contacting sensing and control of the air supply may alternatively be effected in this case by a change of the cross-section of an outlet nozzle with the aid of a control land, as is shown in FIGS. 4 and 6.

Figure 8:
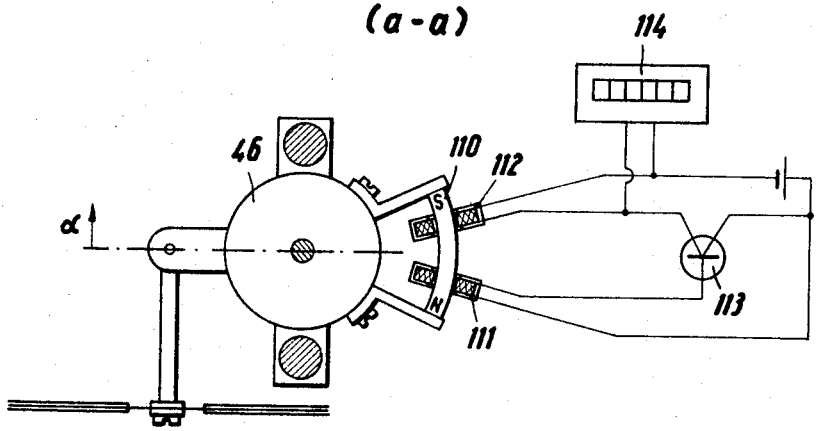
FIG. 8 is a diagrammatic view illustrating an electric drive means for the mechanical pendulum.

FIG. 8 shows an electric drive means for the mechanical pendulum. Such a drive means is known from horology. A permanent magnet 110 is secured to the rotatable mass 46. When the pendulum is oscillating, the magnet 110 moves in a displacement pick-up coil 111 and an exciter coil 112. The amplifier 113 serves for producing a corresponding phase shift between the displacement pick-up coil 111 and the exciter coil 112. It is suitable to provide additional circuitry, known per se, which causes the output of the amplifier 113 to deliver short time pulses, which act on the pendulum approximately when it passes through zero. These pulses appearing at the output of the amplifier may be integrated in a counter 114.

The measuring transducer according to the invention may alternatively be designed in such a manner that the frequency of the string is controlled by a plurality of controlling variables. This enables the measurement of any desired variable, such as the flow rate, after correction for other variables. When a flow rate is to be measured, a correction may be required for variables of state such as pressure, temperature, specific gravity etc.

Figure 9:
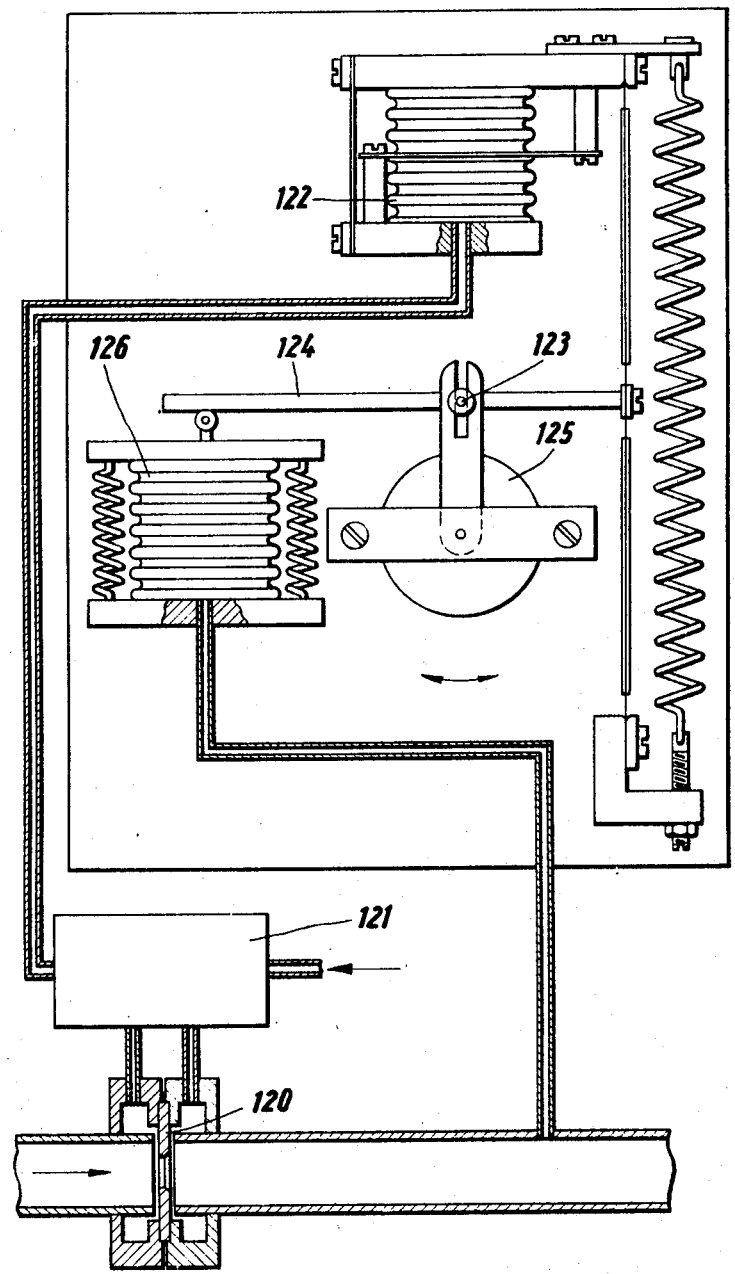
FIG. 9 is a sectional view illustrating a flow rate measurement which is corrected for pressure.

This is illustrated in FIG. 9 with reference to a pressure-corrected flow measurement. A pressure differential is derived at an orifice 120 and is transformed by a known pick-up 121 into a static pressure, e.g., of 3 to 15 pounds per square inch. This static pressure is applied to the measuring bellows 122. The frequency of the pendulum is then proportional to the flow rate. Alternatively, the frequency may be varied by a displacement of the point 123 at which the connector 124 is connected to the rotatable mass 125. A change of the point of connection may be effected, e.g., by a pressure measuring system, which may consist of a spring-loaded metal bellows 126. The drive means for the pendulum have been omitted in this case. Drive means such as have been shown, e.g., in FIGS. 4 to 8 may be used.

Another embodiment will only be described here and enables a change of the moment of inertia of the mass of the mechanical pendulum in dependence on another variable for which a correction is required. For this purpose, additional masses may be radially slidably mounted on the rotatable mass 125 and the distance of these masses from the center of rotation may be varied in dependence on a static pressure. As the moment of inertia of a rotatable mass depends on the distance of this mass from its center of rotation, this arrangement enables also a variation of the frequency and basically the same effect can be achieved as with the arrangement of FIG. 9.

The object of measuring any desired variable while correcting for other variables may be accomplished in another manner with the aid of the mechanical pendulum.

An example is shown in FIG. 10, which illustrates also a corrected flow measurement. The flow rate is measured in dependence on the pressure differential with an instrument of known design, in which the extraction of the square root is effected by means of a camwheel.

By a known instrument 131 for measuring a pressure differential, the pressure differential at an orifice 130 is is converted into a displacement, which is transformed by a suitable geared transmission into an angular movement of the camwheel 132. By means of a sensing lever 133, the rise of the camwheel 132, corresponding to the square root of the pressure differential, is sensed at predetermined intervals of time and is utilized for advancing a counter 134 by a corresponding amount. In known devices of this kind, the sensing lever 133 is driven, e.g., by a synchronous electric motor. A corrected flow meter will be obtained if the frequency of the sensing motor is varied in dependence on a variable of state.

In the described example, the correction is effected by the mechanical pendulum. The synchronous electric motor is replaced by a pneumatic motor 140, which effects a sensing operation in response to each pressure surge in the conduit 135.

The arrangement of the pendulum in FIG. 10 corresponds to that of FIG. 3. The drive means for the pendulum have again been omitted. The frequency of the pendulum depends on the pressure in the metal bellows 136. This pressure is determined by a measuring transducer 137, which converts the pressure of the fluid in the pipeline 129 into a unit pressure. In this arrangement, the frequency of the pendulum is proportional to the square root of the pressure of the fluid. The impulse is delivered to the pneumatic motor 140 by means of an outlet constricting element 138, which is opened and closed once for each oscillation by a land 139. As the auxiliary energy is supplied by a constricting element, the conduit 135 receives one pulse during each oscillation. The pulsing may be pneumatically effected by the pendulum, e.g., by means of a blast nozzle and a receiving nozzle. Alternatively, the sensing linkage may be driven by an electric motor, which performs only one revolution per pulse. In this case the required pulses determining the sensing frequency are generated by the pendulum.

The flow measurement illustrated in FIG. 10 is corrected for pressure. It will be understood that the measuring transducer 137 may be arranged to convert the temperature or the specific gravity of the fluid, in order to provide for a measurement which is corrected for temperature or for changes in the specific gravity.

For a corrected measurement, the frequency of the pendulum may depend on the pressure differential and the correction may be effected by a camwheel. In this case, with reference to FIG. 10, the pressure differential at the diaphragm is converted by a pressure differential pick-up into a static pressure, which is applied to the metal bellows 136. In this case the frequency of the mechanical pendulum is proportional to the flow rate at a constant specific gravity.

The correction is effected by the camwheel 132, which causes now a limitation of the stroke of the sensing lever in dependence on the pressure in the measuring conduit. The sensing pulses are delivered by the mechanical pendulum as is shown in FIG. 10. In this arrangement, the number of pulses is proportional to the square root of the pressure differential and the advance of the counter 134 per pulse is proportional to the square root of the pressure.

As has already been described with reference to FIG. 10, the temperature or the specific gravity may be introduced in this arrangement by suitable measuring transducers as variables for which correction is required.

What is claimed is:

1. A measuring transducer for measuring devices especially for flow meters, comprising tensile means adapted to vibrate at a frequency which is controlled by the tension of said tensile means, at least one measuring signal generator which is responsive to a variable and arranged to control the frequency of said tensile means in response to said variable, means for sensing the frequency of said vibrating tensile means, and means connected to said tensile means and adapted to modify the frequency and to increase the stability of the vibration of said tensile means, said tensile means comprising a string and stiffeners connected to said string and arranged to modify the frequency and increase the stability of the vibration of said string.

2. A measuring transducer for measuring devices especially for flow meters, comprising tensile means adapted to vibrate at a frequency which is controlled by the tension of said tensile means, at least one measuring signal generator which is responsive to a variable and arranged to control the frequency of said tensile means in response to said variable, means for sensing the frequency of said vibrating tensile means, and means connected to said tensile means and adaped to modify the frequency and to increase the stability of the vibration of said tensile means, said tensile means comprises a band and stiffeners are connected to said band and arranged to modify the frequency and increase the stability of the vibration of said band.

3. A measuring transducer for measuring devices especially for flow meters, comprising tensile means adapted to vibrate at a frequency which is controlled by the tension of said tensile means, at least one measuring signal generator which is responsive to a variable and arranged to control the frequency of said tensile means in response to said variable, means for sensing the frequency of said vibrating tensile means, and means connected to said tensile means and adaped to modify the frequency and to increase the stability of the vibration of said tensile means, said tensile means comprises a string and stiffeners in the form of additional mass means are connected to said string and arranged to modify the frequency and increase the stability of the vibration of said string.

References Cited

UNITED STATES PATENTS

| | | | |
|---|---|---|---|
| 3,124,961 | 3/1964 | Bedford | 73—398 X |
| 3,153,351 | 10/1964 | Holmes | 73—517 |
| 3,181,359 | 5/1965 | Osterstrom | 73—407 X |

FOREIGN PATENTS 1,351,050  12/1963  France.

DAVID SCHONBERG, *Primary Examiner.*

DONALD O. WOODIEL, *Assistant Examiner.*